I. BUCKMAN.
OPTOMETER.
APPLICATION FILED FEB. 18, 1909.
947,710.
Patented Jan. 25, 1910.
4 SHEETS—SHEET 1.
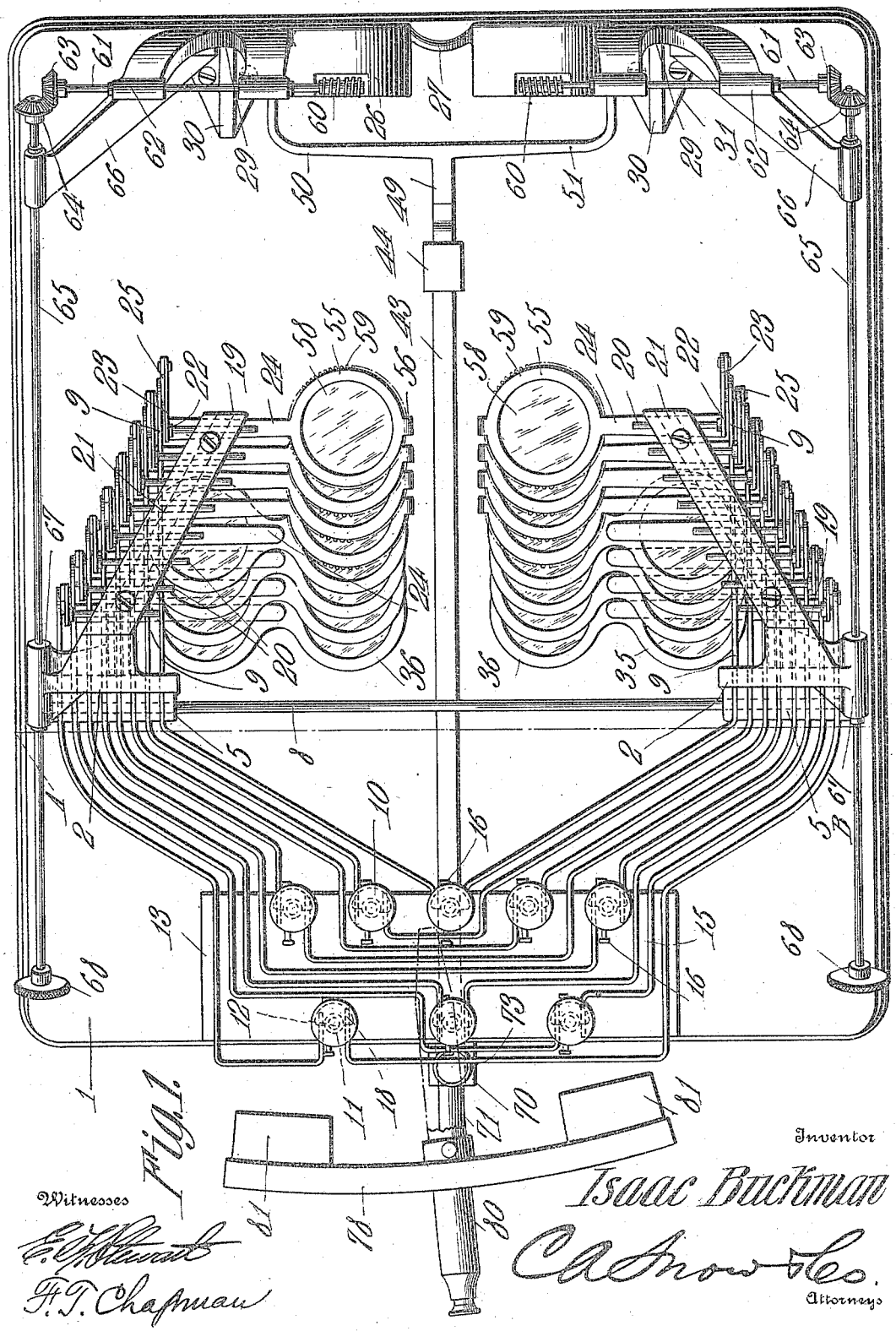
Witnesses
E. G. Stewart
F. T. Chapman
Inventor
Isaac Buckman
C. A. Snow & Co.
Attorneys

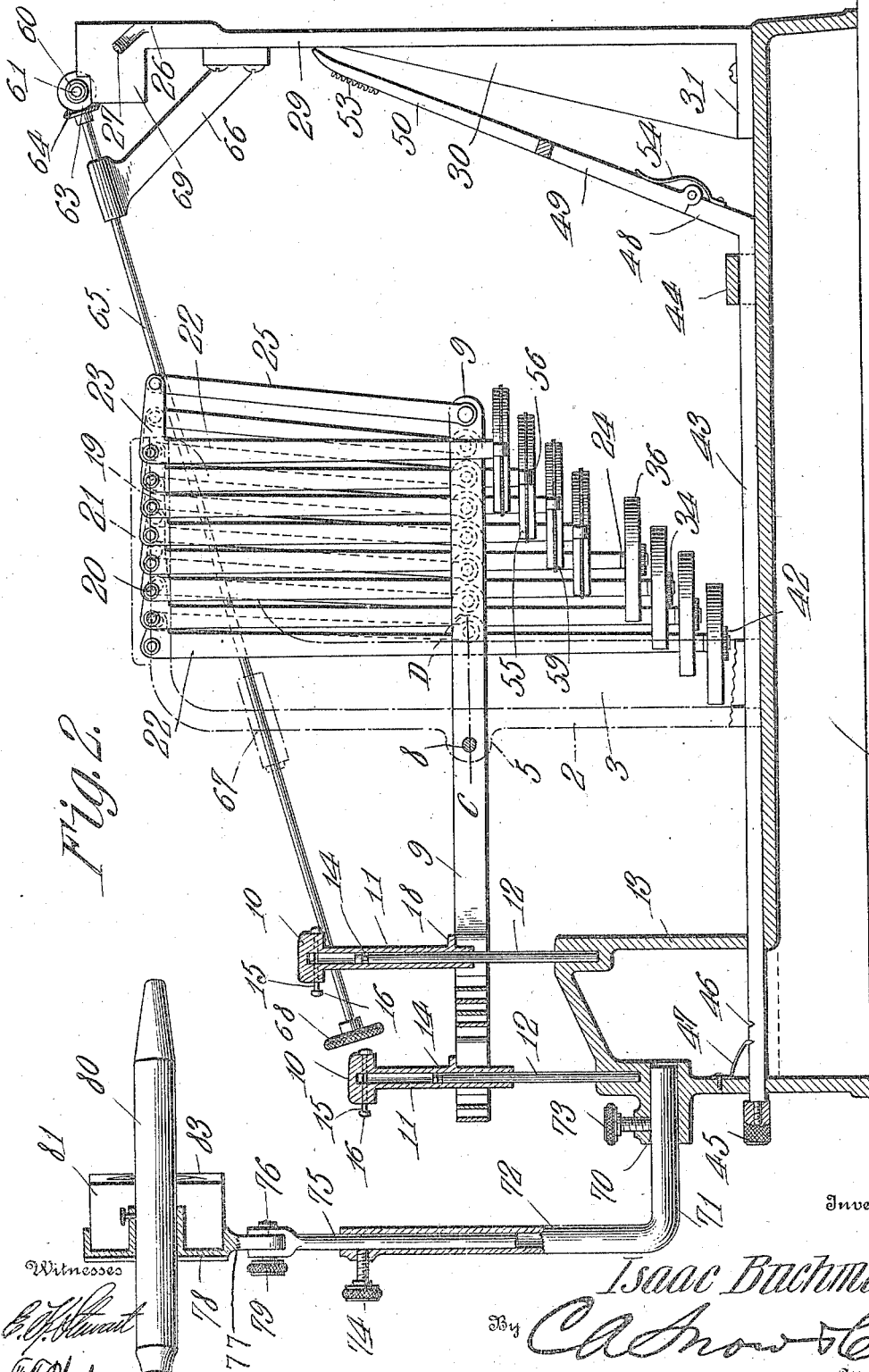

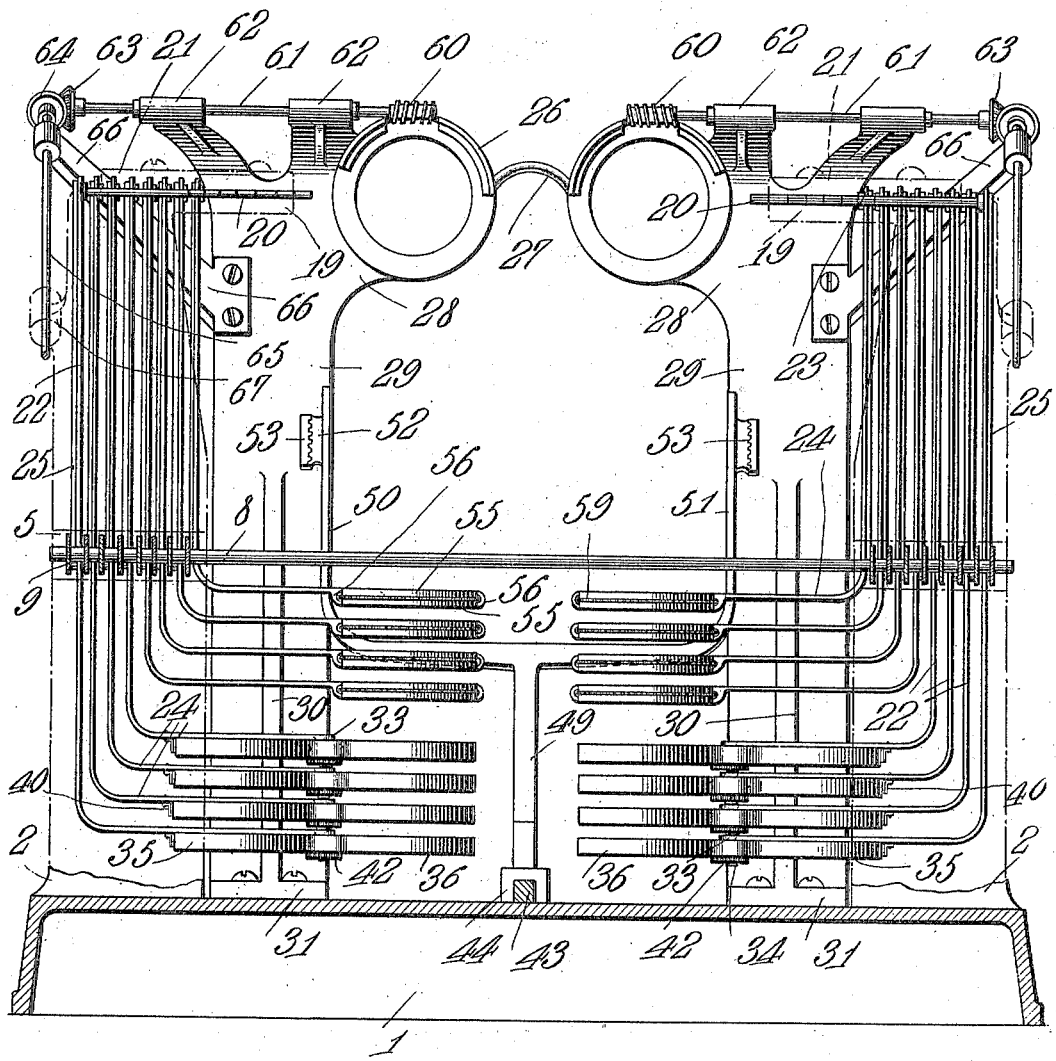

I. BUCKMAN.
OPTOMETER.
APPLICATION FILED FEB. 18, 1909.
No. 947,710. Patented Jan. 25, 1910.
4 SHEETS—SHEET 4.
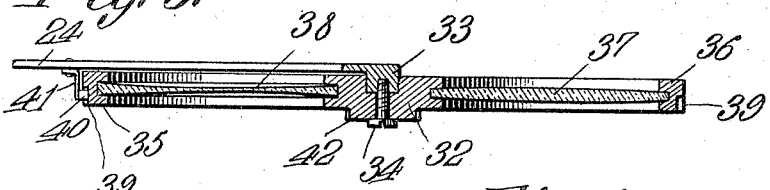
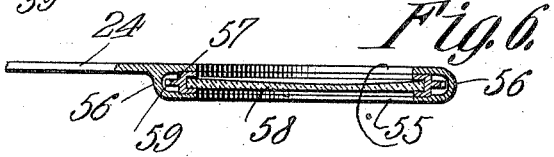
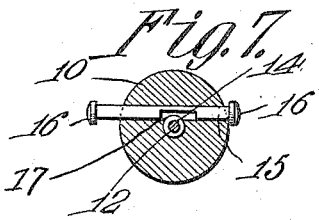
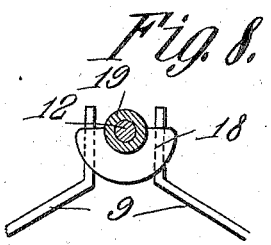
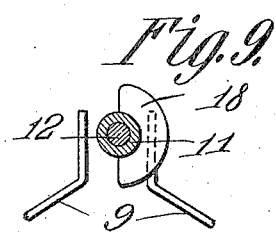
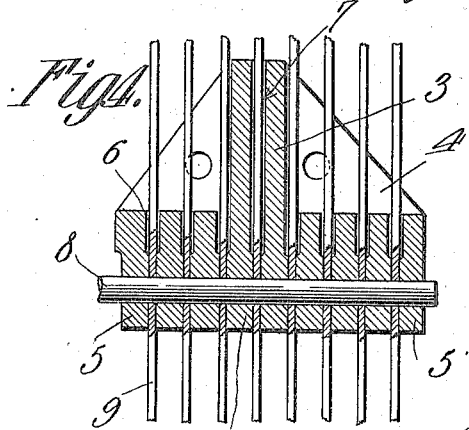
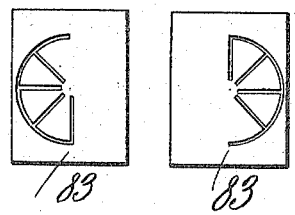
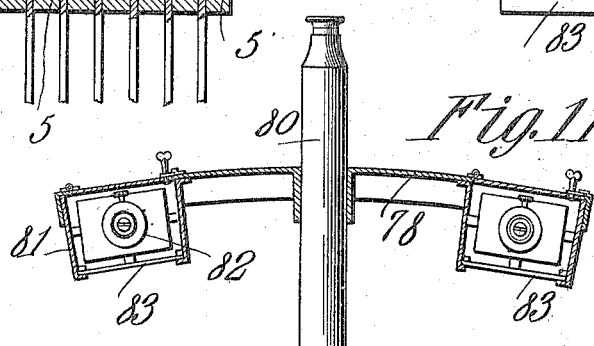
Witnesses
Inventor
Isaac Buckman
By C. A. Snow & Co.
Attorneys

UNITED STATES PATENT OFFICE.

ISAAC BUCKMAN, OF BALTIMORE, MARYLAND.

OPTOMETER.

947,710.  Specification of Letters Patent. Patented Jan. 25, 1910.

Application filed February 18, 1909. Serial No. 478,550.

*To all whom it may concern:*

Be it known that I, ISAAC BUCKMAN, a citizen of the United States, residing at Baltimore, in the State of Maryland, have invented a new and useful Optometer, of which the following is a specification.

This invention has reference to improvements in optometers and its object is to provide an instrument of this character for the testing of eyesight which instrument shall be compact and portable and especially adapted for use by traveling opticians. The instrument is designed moreover to be of such simple nature as to be readily mastered by an operator.

The optometer comprises essentially a series of testing lenses, which under normal conditions may be protected against dust or dirt or harm, together with means for moving such lenses into position in front of one or both eyes of the patient, such operating means being so arranged that either positive or negative lenses or other lenses or testing elements may be brought into position by a minimum number of movements. Furthermore, there is provided in connection with the instrument an ophthalmometer which may be moved into operative position or may be moved out of such position at the will of the operator, the said ophthalmometer being provided with means for carrying oil lamps so that the structure is adapted to a traveling optician where electric currents or other such means of producing illumination are not available.

The invention will be best understood from a consideration of the following detail description, taken in connection with the accompanying drawings forming a part of this specification, in which drawings, Figure 1 is a plan view of the instrument forming the subject matter of the present invention. Fig. 2 is a central longitudinal vertical section of the structure shown in Fig. 1 with some parts in elevation. Fig. 3 is a section on the line A—B of Fig. 1. Fig. 4 is a section on the line C—D of Fig. 2 localized to one side of the structure. Fig. 5 is a detail section of one of the reversible lens carrying frames. Fig. 6 is a detail section through a lens carrying frame adapted to cylindrical or other like lenses or prisms or other testing means requiring axial rotation. Fig. 7 is a detail section through the key locking mechanism. Fig. 8 is a detail section though one of the keys showing the manner of coupling a single key to two key levers. Fig. 9 is a similar section showing the manner of coupling the key to one of the key levers. Fig. 10 is a view of the diaphragms used in the ophthalmometer. Fig. 11 is a plan view with parts in section of the ophthalmometer. Fig. 12 is a detail plan view of the rack and pinion structure for reversing the lens carrier of Fig. 5.

Referring to the drawings there is shown a base 1 of such dimensions as to carry the several structures making up the machine of the present invention, the said device being adapted to be inclosed in a suitable carrying case which however is not shown in the drawings.

Near each side of the base 1 about midway of the length thereof there is erected a post 2 which may be quite thin in the direction of the length of the base 1 and may be suitably strengthened by a web 3. The bottom portion of each post 2 and its web 3 is connected by a foot 4 serving as a means of fastening the post to the base 1.

About midway of the height of each post 2 there is formed thereon a horizontal series of ears 5 in spaced relation one to the other and flanking slots or passages 6 through the post 2. One of these passages extends through the web 3 as shown at 7 although in some forms of the machine this particular structure may be omitted. The number of slots 6 will depend on the size of the machine and the number of optical elements to be employed. The showing in the drawings therefore is to be taken as illustrative only as to the number of optical testing elements which may be incorporated in a single machine constructed in accordance with the present invention.

Extending through the entire series of ears 5 on each post 2 is a rod 8 traversing the spaces between the ears 5 at a point central to the ends of the slots 6 opening into the spaces between the ears 5. In the drawing a single rod 8 is shown as extending from one post 2 to the other but it will be understood that a pivot rod 8 may be employed for each post if so desired. Upon the rod 8 is pivotally mounted a number of levers 9, each lever extending through a slot 6 and the corresponding space between a pair of ears 5. The levers project to opposite sides of the pivot rod 8 and are straight in the direction toward the end of the table 1 where the patient will be located while on the other side of each post 2 the levers 9 are bent at angles so as to be brought into proper relation to a series of keys 10. It will be observed from an inspection of Fig. 1 that there are two sets of levers 9 one set being mounted in one post 2 and the other set in the other post 2 and these two posts are separated by a distance nearly the width of the base 1. The keys 10 are however grouped at the end of the base 1 remote from the position to be occupied by the patient. For a reason which will hereinafter appear each lever 9 of one group is brought into close relation to the corresponding lever of the other group at a single key 10 so that either or both levers may be operated from the one key. This grouping of the levers is best shown in Fig. 1.

Each key 10 has a suitable finger-receiving head to facilitate the movement of the key by the finger of the operator while the stem of the key is hollow or in the form of a sleeve as indicated at 11. Each hollow stem 11 receives a pin 12 erected on a suitable raised portion 13 of the base 1 in the particular structure shown in the drawings although this raised portion may be omitted by making the pins or rods 12 longer. Near the upper end of each rod 12 there is formed an annular groove 14. Extending through the head of each key 10 there is a rod 15 a short distance to one side of a diametric line through the said head. On each end of the rod 15 there is formed a button 16 and the rod is of such length as to have a limited longitudinal movement through the head, this movement being limited in each direction by the corresponding button 16. At an intermediate point the rod is cut away or recessed as shown at 17 so that when the rod 15 is moved in one direction the recess is brought coincident with the groove 14 and when the rod is moved in the other direction this recess is moved out of the line of the groove 14 while the thicker portion of the rod is moved into such groove. This constitutes a simple form of lock so that when a key 10 is depressed with the recess 17 in the path of the rod 12 then the key may be moved up and down without opposition, but after a key is depressed if the rod 15 be moved in the direction of its length so as to bring the larger portion thereof into the groove 14 then the key is locked against returning to its original elevated position. Furthermore, each key 10 is capable of rotating about the longitudinal axis of the rod 12 and near the lower end of the sleeve 11 the latter is provided with a semi-circular radially projecting lip 18. The relation of the lip 18 to the levers 9 is such as to engage either one or both of the adjacent ends of these levers where they lie within the path of a key 10. When the lip 18 is moved to one position it will engage a single one of the levers 9 but the other lever will be out of its path. This position of the parts is shown in Fig. 9. Of course when the position of the lip 18 is reversed from that shown in Fig. 9 then the other lever 9 will be its path. However when the lip 18 is turned to a position 90° removed from that shown in Fig. 9 then both levers 9 adjacent to a corresponding key will be bridged by the lip 18 so that when the key is depressed both levers will be operated simultaneously. This position of the lip 18 is shown in Fig. 8. Under normal conditions, the pins 12 do not extend into the sleeves 11 up to the head of the keys 10 but there remains sufficient space to permit the depression of the keys to the proper extent to move the levers 9 sufficiently as will hereinafter appear.

At the top of each post 2 there is an overhang projection 19 and these two projections form bearings for a number of rods 20 held in place by a cap plate 21 applied to each overhang member 19. The rods 20 are not designed to rotate in their bearings but constitute pivot rods. At the outer ends of the rods 20 there are hung levers 22 each with a bell crank extension 23 at the pivot end and at the other end bent to constitute a horizontal member 24. Each bell crank extension 23 of a lever 22 is connected by a link 25 to the corresponding end of a lever 9, the arrangement being such that when a lever 9 is moved by the depression of a key 10 the corresponding lever 22 will be moved about its pivot rod 20 to bring the end 24 to an upper position away from the pendent position in which it normally lies. Certain of the levers 22 as well as the corresponding levers 9 and keys 10 are so proportioned that the extensions 24 when raised to the elevated position will all move into the same vertical plane although their axes of rotation, that is the rods 20, are displaced horizontally. The extensions 24 therefore describe arcs all of which coincide at a certain point. This point of coincidence is close to but one side of a pair of eye frames 26 joined by a nose-piece 27 and it is through these frames that the patient to be examined is to look, the said frames and nose-piece serving to register the eyes of the patient to the desired position. Each eye frame 26 is mounted on a bracket 28 extending laterally from a post or standard 29 erected on the frame 1 at an appropriate point, the lower end of each standard 29 being stiffened by a web 30 terminating in a foot 31 which facilitates the securing of the post 29 to the base 1. The posts or standards 29 beside serving as supports for the eye frames 26 also serve as supports for other parts which will be described hereinafter.

At the free end of each of certain of the members 24 of the levers 22 there is a hub 32, secured, by means of a screw 34, to a boss 33 formed on the end of the member 24. Any other form of pivotal connection may be employed but the one described will be found effective.

On diametrically opposite sides of each hub 32 there is formed a pair of circular frames 35, 36, one being designed to carry a positive test lens 37 and the other a negative test lens 38 or any other testing means not requiring axial rotation. In the periphery of each frame 35 and 36 there is formed a notch 39 in the path of which is located a stop 40 on the end of a spring support 41 made fast to the member 24. The stop 40 with its spring support 41 is so arranged as to engage the notches 39 on diametrically opposite points in the frames 35 and 36 and while these stops will hold the frames 35 and 36 in proper position the arrangement is such that the stops will yield to a superior force and release the frames. The hub 32 beyond the frames 35 and 36 is formed with a pinion 42. The purpose of this pinion is to cause the rotation of the frames 35 and 36 about the axis of the screw 34 so that either of the lenses 37 or 38 may be brought to a position beyond the end of the member 24 as the operator may will and when such position is attained the frames are locked in the desired position by the stop 40. It is desirable that this movement of the lens carriers 35, 36 should take place automatically and the lenses are moved into position with relation to the eye frames 26, the structure being such that when a key 10 is depressed the corresponding lever 22 with its pair of lenses 37, 38 is actuated so that the lenses are brought into proper relation to the eye frames 26 for the testing of the eyes of a patient located on the opposite side of the frames 26.

In order to cause the presentation of the proper test lens in front of a frame 26 at the will of the operator there is mounted upon the top of the base 1 a rod 43 arranged to slide in bearings through the extension 13 of the frame 1 and through another bearing 44 near the other end of the frame. The rod 43 extends beyond the extension 13 and is there formed with a manipulating head 45 while notches 46 in the rod and a spring catch 47 serve to locate and normally hold the rod in certain adjusted positions, the rod being movable longitudinally. The end of the rod adjacent to the bearing 44 is upturned as indicated at 48 and there has hinged to it an extension 49 from the upper end of which are lateral branches 50 and 51 each ending in a short side extension 52 carrying a short rack 53. The hinge connection between the extensions 48 and 49 is such as to permit the extension 49 to move in a direction toward the key end of the base 1 until the two extensions are in alinement and to there stop while the movement of the extension 49 about the hinge connecting it to the part 48 is resisted by a spring 54 sufficiently strong to hold the member 49 in alinement with the member 48 but which will yield to a comparatively small force. When the rod 43 is moved in a direction toward the post 29 until the stop 47 is in the appropriate notch 46 then the racks 53 are out of the path of the pinions 42. When however the rod 43 is moved in the other direction until the catch 47 engages the other notch 46, then the racks 53 are in the path of the pinions 42 but are also in the path of the free ends of the arms 54 so that as the latter move toward the upper position the forked ends 50 or 51 are engaged by the end of the actuated lever extension 24 and the spring 54 will yield to permit the passage of the said extension 24. However a pinion 42 is brought into engagement with a rack 53 and the parts are so proportioned that the frames 35 and 36 are caused to rotate about the screw 34 for one-half a revolution, thus causing the presentation of the chosen one of the lenses 37 or 38 into the line of sight of the patient gazing through the frames 26. Any suitable means may be employed for designating to the operator which of the two lenses would be presented by the intervention of the rack 53. Any characteristic designation may be employed, as, for example, the frames 35 and 36 where visible may be distinctly colored so that the operator may know at a glance whether the positive or the negative lenses will be presented without the intervention of the rack 53 so that if a change is desired the rack 53 may be brought into the path of the pinion 42.

For some eye defects, such for instance as astigmatism, cylinder lenses are employed, and as the angle of the astigmatism may vary the corrective lenses must be capable of rotation about their cylindrical axes, that is the axes of the cylinders to which their ground surfaces coincide. For this purpose the frame in which each lens of the cylinder or like type is mounted is made rotative so that its axis of generation may be set at any desired angle to the optical axis of the eye of the patient. Such a mounting is shown in Fig. 6 where it will be seen that the extension 24 of a lever 22 carries two like rings 55 in spaced parallel relation and connected together at diametrically opposite points or oftener if desired by yokes 56. Mounted for rotation between the two frame members 55 is another frame 57 in the form of an annulus in which is mounted a lens 58 which may be a cylinder lens or a prism or any other optical testing means requiring rotation about an axis coinciding with the optical axis of the eye of the patient. The outer periphery of the frame 57 is formed with gear teeth 59 by means of which any degree of rotative movement is imparted to the frame 57. Such rotative movement is desired only when the lens or other testing element is in front of the patient's eye. For this purpose there is mounted in proper relation to the frames 26 suitable worms 60 arranged to engage the gear teeth 59 when a frame 57 is brought into proper relation to an eye frame 26. Each worm 60 is mounted on a shaft 61 mounted in journal bearings 62 formed on the upper end of a corresponding standard 29 and this shaft 61 has at the end remote from the worm 60 a bevel pinion 63 in mesh with another bevel pinion 64 on the corresponding end of a shaft 65 having journal bearings in brackets 66 fast on the corresponding standard 29 and also another bearing 67 on a suitable bracket projecting from a corresponding post 2. The other end of the shaft 65 is provided with a suitable milled manipulating head or button 68. Since it is necessary to test each eye separately two such arrangements for rotating the testing elements 58 are provided.

The eye frames 26 are provided with overhangs 69 on the side remote from the patient to limit the upward movement of the lens carriers and to constitute a stop which together with the lock composed of the rod 15 and the groove 14 in the rod or stem 16 will serve to hold the lenses firmly in place. Each worm 60 extends through this overhang, a suitable slot being provided for the purpose, so that it will be brought into engagement with the gear teeth 59 when the carrier 57 is in suitable relation to an eye frame 26.

A traveling optician must have a compact instrument and yet one capable of testing all the defects to which the eye is subject. For this purpose there is added to the instrument an ophthalmometer suitably modified for use in connection with the instrument so far described and especially designed for use under varying conditions. The optical parts of the ophthalmometer need not be described and are not shown in detail since they form no part of the present invention, the instrument being in general similar to those in common use.

A horizontal socket 70 is formed in the operator's side of the part 13 of the base 1 and this socket is adapted to receive the angle extension 71 of a hollow post 72, a thumb screw 73 being carried by the socket 70 for the purpose of clamping the post 72 in any desired position about the axis of the angle member 71. Near the upper end the post 72 carries a thumb screw 74 for the purpose of clamping a rod 75 in any desired position of vertical adjustment in the post 72. Hinged to the upper end of the post 75 as indicated at 76 is a support 77 carrying a frame 78 extending to opposite sides of the support 77. A thumb clamp screw 79 serves to lock the hinge 76 in any desired position.

Immediately above the support 77 is mounted the optical tube 80 on each side of which the frame 78 extends. At the outer ends of the frame 78 there are mounted boxes or receptacles 81 designed to contain a suitable source of light. For practical purposes the only available source of light for the traveling optician is an oil light, and these boxes are therefore adapted to contain suitable oil lamps. They are arranged so that they will throw a beam of light upon the eye of the patient in the focus of the tube 80 and this focus is coincident with the eye of a patient applied to one or the other of the eye frames 26. Such lamps are indicated at 82 in Fig. 11. The front of each box or receptacle 81 is provided with a diaphragm 83 having circular and radial slots as shown in Fig. 10 so that an image of the slot is cast upon the cornea of the eye of a patient, and appropriate tests are made thereby.

When the ophthalmometer is in use it is elevated to the position indicated in Fig. 2 and then the testing lenses or other similar testing elements are not employed. When the testing elements controlled by the keys 10 are employed, then the ophthalmometer is turned down to one side out of the way by loosening the thumb nuts 73 and 79. On loosening the thumb nut 73 the ophthalmometer may be removed for packing or other purposes.

Suppose now that with a structure such as has been described it is desired to test the eyes of a patient, then such patient is so located that the eyes are coincident with the frames 26 looking in a direction toward the keyboard end of the frame 1. The operator depresses some one of the keys 10 to elevate a test lens 37 or 38 if such lens be indicated by the general condition of the patient. If a positive lens 37 be the outer lens carried by the extension 24 of the particular lever 22 operated by the depressed key 10 then the patient is instructed to observe a suitable test chart through such lens. The testing proceeds in the usual manner until the proper lens be selected and then the other eye of the patient is tested in the usual manner and finally both eyes may be tested. Let it be assumed however that the positive lens is not the one wanted but happens to be the one which with the parts in the position of rest is the outer lens of the pair carried by a lever 22. In order to select the negative lens of the pair the rod 43 is moved from its normal inactive position to the active position by pulling on the hand hold 45. Now the racks 53 are in the paths of the pinions 42 of all the hubs 32 and consequently when a key is depressed to elevate the positive and negative lenses then the pinion 42 is brought into engagement with the particular rack 53 in its path and the carrier for the lenses 37 and 38 is given a half rotation and is stopped in that position by the engagement of the catch 40 with the notch 39 of the lens out of service, holding the lens desired in the active position. If in the normal position of the parts all the positive lenses be located beyond the ends of the members 24 of the levers 22 and the negative test lenses be desired then the racks 53 may remain in the paths of the pinions 42 so that on the return of these lenses to the pendent position they may be returned to their normal relative positions with relation to the extension 24 of the levers 22. It is not of course material that this position of the parts be maintained since the racks 53 may be thrown into and out of the paths of the pinions 42 at will. Since the arcs described by the pinions 42 in passing from the pendent to the elevated position do not coincide, the racks 53 are so located as to be in the paths of the pinions most remote from the standard 29 when being moved to the upper position. The other pinions will be brought into active relation with the racks by the movement of the forked ends 50 and 51 due to the yielding of the spring 54 on the engagement of the lever extensions 24 with such fork ends 50 and 51, so that even though the pinions 42 describe slightly different paths they will be brought into proper relation with the racks 53 whenever moved to the upper position, assuming of course that the rod 43 has been properly moved to bring the racks into the active position. When a key is depressed it may be locked in the said position by the operator moving the rod 15 to engage the groove 14 in the stem or pin 12. This will serve to lock the active lens in position relative to the particular frame 26 behind which the eye being tested is located. On releasing a key 10 from its locked depressed position the weight of the parts will cause the test lenses to drop to their normal pendent position and the key will thereby be elevated to its normal position. After the proper lens has been selected for one eye of the patient then the keys desired are given a half turn to bring the lip 18 into operative engagement with the proper lever 9 and the operation already described may be repeated with the other set of levers 9 from the ones first used.

Again assume that it is desired to carry the chosen lenses into operative relation to the patient's eyes so that the patient may observe the test chart with both eyes at the same time. Under these conditions the lip 18, if any two adjacent levers be the ones to be so operated, is turned to bridge the two adjacent lever ends and the proper lenses may thereby be elevated into operative relation to the patient's eyes and there locked. Of course if other lenses be desired then two separate keys may be depressed and locked to hold the desired lenses in operative relation to the patient's eyes.

Let it again be assumed that there are other defects in the patient's eyes which require the use of the test elements 58 either with or without the test lenses 37 or 38. The test elements 58 may be mounted on the shorter levers 22, it being observed from the showing of Fig. 2 that the levers vary in length, and since these test elements 58 are not necessarily mounted in reversible frames such as the lenses 37 and 38, though of course it is evident that these test elements 58 may be so mounted, they are unprovided with pinions 42 and are so located that the arcs described by these lenses do not bring them into the paths of the racks 53 even when the rod 43 has been moved to bring the racks into the active position with relation to the pinions 42. The levers 22 carrying the test elements 58 are so located and of such length that the several test elements 58 will be brought to a common point but will be out of the path of the lenses 37 or 38, so that the test elements 58 may be used in conjunction with the lenses 37 or 38.

The test elements 58 may consist of cylinder lenses, or prisms, or double prisms, or stenopaic slits, or any test element to be used with or without the lenses 37 or 38.

The axes of the cylinder lenses intersect the optical axis of the patient's eyes and these axes of the cylinder lenses may have to be placed so as to incline to the right or left of a neutral plane to any desired degree and it is therefore necessary that the cylinder lens mountings be rotatable on an axis agreeable to the optical axis of the patient's eye. This is accomplished by the worm 60 which is brought into engagement with the rack teeth 59 on the periphery of the frame 57 holding the test element 58 when the said element 58 is in its active position with relation to the eye frame 26.

The operator may readily rotate the frame 57 with the element 58 carried thereby by a suitable manipulation of the milled head 68 of the shaft 65 on the appropriate side of the apparatus. The angle of inclination of the axis of the cylinder lens or other element 58 is conveniently read off from a suitable scale not shown in the drawings but always present in test elements of this character.

It will be understood of course that all the testing elements whether they be the lens 37 or 38 or the testing element 58 are provided with suitable indicating characteristics visible to the operator located at the keyboard end of the instrument. Such designating characteristics will be those usually employed for the purpose and therefore need not be shown in the drawings.

The ophthalmometer, while optically the same as those in ordinary use, differs therefrom in that the mires together form a complete circle showing all the meridians at once. When it is desired to ascertain the corrective lenses for astigmatism the ophthalmometer is used and the reflection of the mires on the cornea of the eye being tested is noted. Under the ordinary use of the ophthalmometer it is necessary to refer to scales in order to ascertain the corrective lenses for the fault noted. With the present invention the operator moves a cylinder lens into position and rotates the same in the proper direction, and if this does not bring the images of the two mires into the relation of a complete circle without displacement then another lens next in order is tried and so on until the proper corrective lens is found, thus indicating without recourse to scales and without the liability of error the proper corrective lens for the fault of the eye being examined, the reading being directly from the lens in the usual manner. The mires themselves differ from those in ordinary use in combining into a complete circle, each mire representing one-half the circle. When the ophthalmometer is not to be used it may be moved out of the way by loosening the screws 73 and 79 when it may be folded down to one side.

The present invention provides a compact and easily manipulated instrument especially adapted to traveling opticians and also equally useful for opticians having fixed offices. By an instrument constructed in accordance with the present invention all the eye defects usually met with may be ascertained and suitable corrective glasses be prescribed. The instrument is very compact and the lenses are readily protected from dust or dirt or injury.

What is claimed is:—

1. In an optometer, rotatable carriers for testing elements each having testing elements of different characters mounted therein, means for moving the carriers from an inoperative to an operative position, and an engaging member under the control of an operator and movable into the path of the carriers for automatically causing the presentation of the selected one of the testing elements on the carrier on the movement of the latter to operative position.

2. In an optometer, rotatable carriers for testing elements each mounted on a pendent support and each having testing elements of different characters mounted therein, means for moving the carriers from an inoperative pendent position to an operative elevated position, and an engaging member under the control of an operator and movable into the path of the carriers for automatically causing the presentation of a selected one of the testing elements on the movement of a carrier to active position.

3. In an optometer, rotatable carriers each having testing elements thereon and each mounted for bodily movement from an inoperative to an operative position, and means under the control of an operator for causing the rotation of a carrier during its movement to or from the operative position, comprising an engaging member on each carrier and a member co-acting with the said members on the carriers and movable into and out of the path of the carrier members at will.

4. In an optometer, rotatable carriers each having testing elements thereon and each mounted for bodily movement from an inoperative to an operative position, and means under the control of an operator for causing the rotation of a carrier during its movement to or from the operative position comprising a pinion on each carrier and a rack movable into or out of the path of the pinions.

5. In an optometer, rotatable carriers each having testing elements thereon and each mounted for bodily movement from an inoperative to a common operative position, through different paths, and means under the control of an operator for causing the rotation of a carrier during its movement to or from the operative position comprising a pinion on each carrier and a rack movable into or out of the path of the pinions and a carrier for the rack yieldable in a direction away from the paths of the carriers.

6. In an optometer, testing elements, pivoted supports therefor each movable on an axis at right angles to the optical axis of a testing element when in operative position, key levers, connections between the key levers and the pivoted supports, and keys for the key levers.

7. In an optometer, testing elements, supports therefor pivoted in retreating order from the operative positions of the testing elements, key levers, connections between the key levers and testing element supports, and keys for the key levers, the movements of the key levers and pivoted supports being proportioned to the distance of the pivots of the supports from the operative positions of the testing elements.

8. In an optometer, a series of levers having angle extensions at one end, testing elements at the other ends of the levers, pivots for said levers arranged in retreating order from a predetermined point and having their longitudinal axes at right angles to the optical axis of the testing elements, key levers, links between the key levers and the angle extensions of the first named levers, and keys for the key levers.

9. In an optometer, a series of levers having angle extensions at one end, testing elements at the other end of the levers, pivots for said levers arranged in retreating order from a predetermined point, key levers, links between the key levers and the angle extensions of the first named levers, and keys for the key levers, the angle extensions of the first named levers and the range of movement of the keys being proportioned to the distances of the lever pivots from the said predetermined point.

10. In an optometer, carriers for testing elements, key levers equal in number to the carriers and a less number of keys for the key levers each adapted to control more than one key lever.

11. In an optometer, carriers for testing elements, key levers equal in number to the carriers and a less number of keys for the key levers each adapted to control more than one key lever either individually or collectively.

12. In an optometer, two groups of carriers for testing elements, one group for each eye, key levers connected to the carriers, the free ends of the levers controlling carriers with like testing elements being brought into juxtaposition, and a key for each pair of key levers controlling like testing elements and movable into operative relation to either lever.

13. In an optometer, two groups of carriers for testing elements, one group for each eye, key levers connected to the carriers, the free ends of the levers controlling carriers with like testing elements being brought into juxtaposition, and a key for each pair of key levers controlling like testing elements, said key being movable into operative relation to either or both of said key levers.

14. In an optometer, a group of testing elements, and actuating members for moving selected ones of said elements into operative position without moving the other testing elements of the group, said actuating members each carrying a lock coacting with a fixed portion of the device for holding a respective testing element in operative position.

15. In an optometer, a series of testing elements of like character, and keys for moving said elements to operative position, each key being composed of a head with a hollow stem, a guide pin entering the hollow stem and provided with a circumferential groove, and a locking rod traversing the head of the key and movable into and out of the groove in the guide pin.

16. In an optometer, testing elements, a system of operating levers therefor arranged with their free ends in juxtaposed pairs, and operating keys, one for each pair of levers, each key being movable longitudinally and rotatable on its longitudinal axis and provided with a lip adapted to engage either lever of a pair.

17. In an optometer, testing elements, a system of operating levers therefor, arranged with their free ends in juxtaposed pairs, and operating keys, one for each pair of levers, each key being movable longitudinally and rotatable on its longitudinal axis and provided with a lip adapted to engage either or both levers of a pair.

18. In an optometer, a series of carriers for testing elements movable individually into operative position, and an operating member engaging the carriers when in operative position for then rotating them.

19. In an optometer, an eye frame for positioning the eye to be tested, carriers for testing the elements movable individually into position with relation to the eye frame, and a carrier actuating element at the eye frame and under the control of an operator for causing the rotation of a carrier when in position at the eye frame.

20. In an optometer, an eye frame for positioning the eye to be tested, carriers for testing elements movable individually into position with relation to the eye frame, a keyboard and connections therefrom to the carriers for operating the latter, a carrier actuating element at the eye frame for causing the rotation of a carrier when in position at the eye frame, and a manipulating element at the keyboard and connections therefrom to the carrier actuating element for operating the latter to cause the rotation of the carriers.

21. In an optometer, an eye frame for positioning the eye to be tested, carriers for testing elements movable individually into position with relation to the eye frame and each carrier provided with peripheral gear teeth, and a worm at the eye frame and under the control of the operator and adapted to engage the gear teeth on a carrier when in position at the eye frame.

22. In an optometer, an eye frame for positioning the eye to be tested, carriers for testing elements movable individually into position with relation the eye frame, a keyboard and connections therefrom to the carriers for causing the movement of the latter at will, said carriers being each provided with peripheral gear teeth, and a worm at the eye frame adapted to engage the gear teeth on a carrier when in position at the eye frame, and a manipulating means at the keyboard and connected to the worm for causing the rotation of a carrier in position at the eye frame at will.

23. In an optometer, an eye frame for positioning the eye to be tested, testing elements, carriers therefor movable into operative position with relation to the eye frame, said position being common to all said testing elements, other testing elements, carriers therefor movable into a common operative position with reference to the eye frame but at a different distance therefrom than the operative position of the first named testing elements, and means for moving a selected one of a group of testing elements of like character at will without disturbing the other testing elements of the same group.

24. In an optometer, an eye frame for positioning the eye to be tested, testing elements, carriers therefor movable into operative position with relation to the eye frame, said position being common to all the said testing elements, other testing elements, carriers therefor movable into a common operative position with reference to the eye frame but at a different distance therefrom than the operative position of the first named testing elements, and means for moving selected ones of a plurality of groups of testing elements of like character at will without disturbing the other testing elements of a group of testing elements of like character.

25. In an optometer, an eye frame for positioning the eye to be tested, testing elements, carriers therefor movable into a common operative position with relation to the eye frame, other testing elements, carriers therefor movable into a common operative position with reference to the eye frame but at a different distance therefrom than the operative position of the first named testing elements, keys, and connections therefrom to the carriers for the individual actuation of the latter to operative position.

26. In an optometer, an eye frame for positioning the eye to be tested, testing elements, carriers therefor bodily movable into a common operative position with relation to the eye frame, each carrier having a plurality of testing elements mounted therein, means for causing a rotatative movement of each carrier on its bodily movement to or from the operative position, other testing elements, carriers therefor movable into a common operative position with reference to the eye frame but at a different distance therefrom than the operative position of the first named testing elements, keys and connections therefrom to the carriers for the individual actuation of the latter to operative position, and means for rotating the second named testing elements, when in operative position about the optical axis of the eye being tested.

27. In an optometer, a suitable frame, an ophthalmometer at one end of said frame, cylinder lenses at the other end of said frame, and rotatable about the optical axis of the ophthalmometer, and means for rotating the cylinder lenses accessible from the ophthalmometer end of the frame.

28. In an optometer, a suitable frame, an ophthalmometer at one end of said frame, cylinder lenses at the other end of said frame movable into and out of and rotatable about the optical axis of the ophthalmometer, means for rotating the cylinder lenses and means for causing the movement of the cylinder lenses into operative position at will, the said means for rotating and for causing the operative movement of the cylinder lenses being accessible from the ophthalmometer end of the frame.

29. In an optometer, a suitable frame, an ophthalmometer at one end of the frame, a folding support for the ophthalmometer, cylinder lenses at the other end of said frame, and rotatable about the optical axis of the ophthalmometer, and means for rotating the cylinder lenses accessible from the ophthalmometer end of the frame.

30. In an instrument for testing eyes, a suitable frame, an ophthalmometer telescope at one end of said frame, mires in operative relation to the telescope and each including a semi-complete meridian indicator, a cylinder-lens carrier at the other end of the frame, and rotating means for the carrier operating thereon when in the optical axis of the telescope, said rotating means being operable at will.

In testimony that I claim the foregoing as my own, I have hereto affixed my signature in the presence of two witnesses.

ISAAC BUCKMAN.

Witnesses:
   JAS. M. WALKER,
   E. DANIEL.